No. 745,709. PATENTED DEC. 1, 1903.
C. A. WRIGHT.
STOCK FEEDER.
APPLICATION FILED AUG. 15, 1903.
NO MODEL.
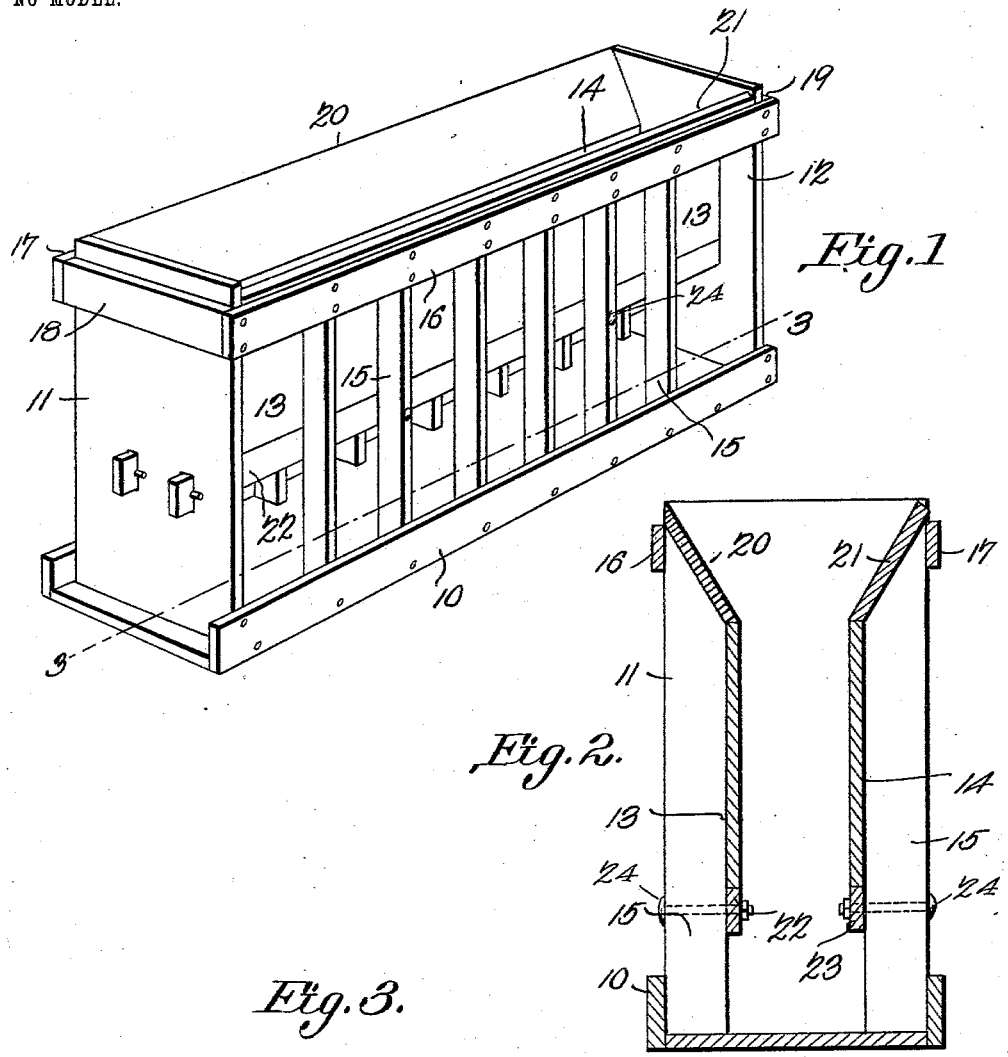
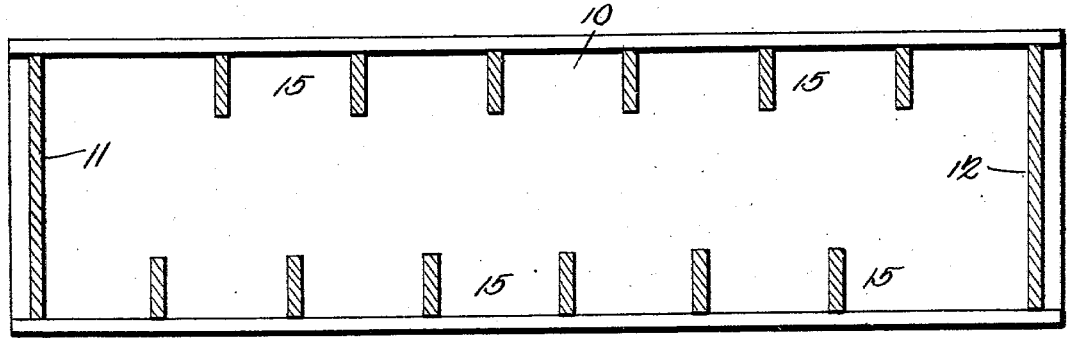
Witnesses
C. F. Stewart
C. N. Woodward
C. A. Wright, Inventor.
by C. A. Snow & Co.
Attorneys No. 745,709. Patented December 1, 1903.

UNITED STATES PATENT OFFICE.

CANBY A. WRIGHT, OF RUSH, MISSOURI.

STOCK-FEEDER.

SPECIFICATION forming part of Letters Patent No. 745,709, dated December 1, 1903.

Application filed August 15, 1903. Serial No. 169,615. (No model.)

*To all whom it may concern:*

Be it known that I, CANBY A. WRIGHT, a citizen of the United States, residing at Rush, in the county of Andrew and State of Missouri, have invented a new and useful Stock-Feeder, of which the following is a specification.

This invention relates to stock-feeding devices, and has for its object to simplify and improve structures of this character and produce a simply-constructed and easily-operated device which may be adapted to the growing animals; and the invention consists in certain novel features of construction, as hereinafter shown and described, and specified in the claims.

In the drawings, in which corresponding parts are denoted by like designating characters, Figure 1 is a perspective view of the improved structure. Fig. 2 is a transverse section. Fig. 3 is a plan view in section on the line 3 3 of Fig. 1.

The improved structure comprises a trough member 10, preferably with vertical side walls and with upwardly-extended ends 11 12, as shown. The trough member may be of any length and width, but will generally be about one foot wide and twelve feet long, but these dimensions may be varied to any required extent, as I do not wish to be limited to any specific size for the different parts of the structure. Connected between the ends 11 12, centrally above the trough, is a feed-chute formed of spaced side walls 13 14 and terminating above the trough, as shown in Fig. 2.

Between the walls 13 14 of the chute and the side walls of the trough member are disposed division-plates 15, set at right angles to the trough and chute and spaced apart, as shown. The plates 15 extend to the bottom of the trough and are connected at their upper ends by side plates 16 17, the latter supported at the ends by transverse plates 18 19, which also support the end members 11 12, as shown.

Extending between the end members 11 12 and also along the upper edges of the chute members 13 14 are inclined hopper members 20 21, which are also supported by their outer edges upon the upper edges of the members 16 17, as shown. The division-plates 15 also extend by their upper ends into engagement with the under sides of the members 20 21, as shown in Fig. 2.

The function of the division-plates is to keep the animals separated and permit their heads only to enter the feed-trough to prevent waste of the feed and also to insure the equal division of the feed and prevent the stronger animals crowding the weaker away from the feed.

To prevent the animals feeding at opposite sides of the trough from interfering with each other and also to insure the equal distribution of the feed, the division-plates 15 on one side are disposed opposite the center of the space between the like plates on the other side, as shown in Fig. 3. By this means a substantially independent supply of feed is furnished to each animal and the amount furnished is uniform to each animal and each animal protected from interference from his fellows while feeding. By this means it is obvious the weaker animals will be protected from interference from the stronger and the uniform growth insured.

The end members 11 12 are provided with spaced apertures opposite the ends of the chute members 13 14 and just below their lower edges, in which guard-plates 22 23 are supported and form downward extensions to the chute-walls, as shown in Figs. 1 and 2. These guard-plates thus reduce the space between the bottom of the trough and the chute and serve to confine the feed and prevent its too rapid discharge when certain kinds of feed are employed and also to provide means whereby the device may be adapted for the smaller or younger animals to prevent them passing through the trough transversely. As the animals increase in size the members 22 23 may be removed and the device thus adapted to the animals as their growth increases. Then, again, the guard-plates provide for feeding large animals at one side and smaller animals at the other side by removing one only of the guard-plates, as will be obvious.

The device will be wholly of wood and may be cheaply constructed and will be found very convenient and useful for the purposes denoted.

The device may be employed upon small farms or upon the largest stock-farms with equal advantage, as it may be constructed of any size and of any capacity.

If required, the members 22 23 may be bolted intermediately of their ends to the vertical division-plate 15, as shown at 24, any required number of the bolts being employed, according to the length of the device.

The nuts will preferably be upon the inner end of the bolts, with the heads at the outer ends and rounded or sunken in the wood to offer no obstruction to the movements of the animals.

Having thus described the invention, what I claim is—

1. In a stock-feeder, a trough member, a feed-chute disposed centrally above said trough member, division-plates disposed at right angles to said trough member and feed-chute, and spaced apart between the chute and side walls of said trough member, and guard-plates detachably connected to the lower edges of said feed-chute and forming an extension thereof, and likewise detachably connected to the inner edges of said division-plates, substantially as described.

2. In a stock-feeder, a trough member having vertically-extended ends, provided with spaced apertures, a feed-chute extending between said trough ends, and guard-plates supported detachably in said apertures and forming extensions to the discharge end of said chute, substantially as described.

3. In a stock-feeder, a trough having vertically-extended ends, a feed-chute arranged between said ends and comprising upper hopper members having side members depending from the lower edges thereof, terminating above the trough and spaced inward from the side edges of the end members, and spaced division-plates disposed in said troughs and engaging the lower faces of the hopper members and spanning the space between the side members of the chute and the trough thereby serving as braces for the chute and as division members for the trough.

In testimony that I claim the foregoing as my own I have hereto affixed my signature in the presence of two witnesses.

CANBY A. WRIGHT.

Witnesses:
W. L. WRIGHT,
M. BRADFORD.